US008883362B2

(12) United States Patent
Saito et al.

(10) Patent No.: US 8,883,362 B2
(45) Date of Patent: Nov. 11, 2014

(54) FUEL CELL SYSTEM

(75) Inventors: Bunichi Saito, Wako (JP); Tomio Miyazaki, Wako (JP); Kimiko Fujisawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 13/062,663

(22) PCT Filed: Jul. 30, 2009

(86) PCT No.: PCT/JP2009/063544
§ 371 (c)(1),
(2), (4) Date: Mar. 7, 2011

(87) PCT Pub. No.: WO2010/026844
PCT Pub. Date: Mar. 11, 2010

(65) Prior Publication Data
US 2011/0159391 A1  Jun. 30, 2011

(30) Foreign Application Priority Data
Sep. 8, 2008 (JP) ................... 2008-229675

(51) Int. Cl.
H01M 8/04 (2006.01)
H01M 8/24 (2006.01)
H01M 8/10 (2006.01)
H01M 8/08 (2006.01)
H01M 8/14 (2006.01)
H01M 8/12 (2006.01)
H01M 8/06 (2006.01)

(52) U.S. Cl.
CPC .... *H01M 8/2475* (2013.01); *H01M 2008/1095* (2013.01); *H01M 8/086* (2013.01); *Y02E 60/50* (2013.01); *Y02E 60/525* (2013.01); *H01M 2008/147* (2013.01); *H01M 2008/1293* (2013.01); *H01M 8/0662* (2013.01); *H01M 8/0494* (2013.01); *H01M 8/0618* (2013.01); *H01M 8/083* (2013.01); *Y02E 60/526* (2013.01); *H01M 8/04014* (2013.01)

USPC .......................................... 429/439; 429/456

(58) Field of Classification Search
None
See application file for complete search history.

(56) References Cited

U.S. PATENT DOCUMENTS

| 6,835,479 | B2 * | 12/2004 | Balliet et al. .................. 429/429 |
| 7,083,875 | B2 * | 8/2006 | Lillis et al. .................... 429/422 |
| 7,494,731 | B2 | 2/2009 | Hattori et al. | |
| 2004/0048120 | A1 * | 3/2004 | Haltiner et al. ................. 429/24 |

FOREIGN PATENT DOCUMENTS

| JP | 1-320775 | 12/1989 |
| JP | 4-75263 | 3/1992 |
| JP | 05-290868 | 11/1993 |
| JP | 2003-208915 | 7/2003 |
| JP | 2003-217635 | 7/2003 |
| JP | 2008-98019 | 4/2008 |
| WO | WO 9908354 A1 * | 2/1999 |

OTHER PUBLICATIONS

International Search Report for Application No. PCT/JP2009/063544, dated Sep. 1, 2009.

* cited by examiner

*Primary Examiner* — Milton I Cano
*Assistant Examiner* — Wojciech Haske
(74) *Attorney, Agent, or Firm* — Nelson Mullins Riley & Scarborough LLP; Anthony A. Laurentano

(57) ABSTRACT

A case configuring a fuel cell system is divided into a module section, a first fluid supply section, a second fluid supply section, and an electric section. The electric section is provided with a first intake vent for intake of an oxidant gas from outside the case into the electric section. The second fluid supply section is provided with a second intake vent for intake of the oxidant gas subjected to intake from the first intake vent, into an oxidant gas supply device. The case is internally provided with first and second internal partitions which generate a bypass path for blocking straight flow of the oxidant gas from the first intake vent to the second intake vent.

8 Claims, 21 Drawing Sheets

FIG. 3
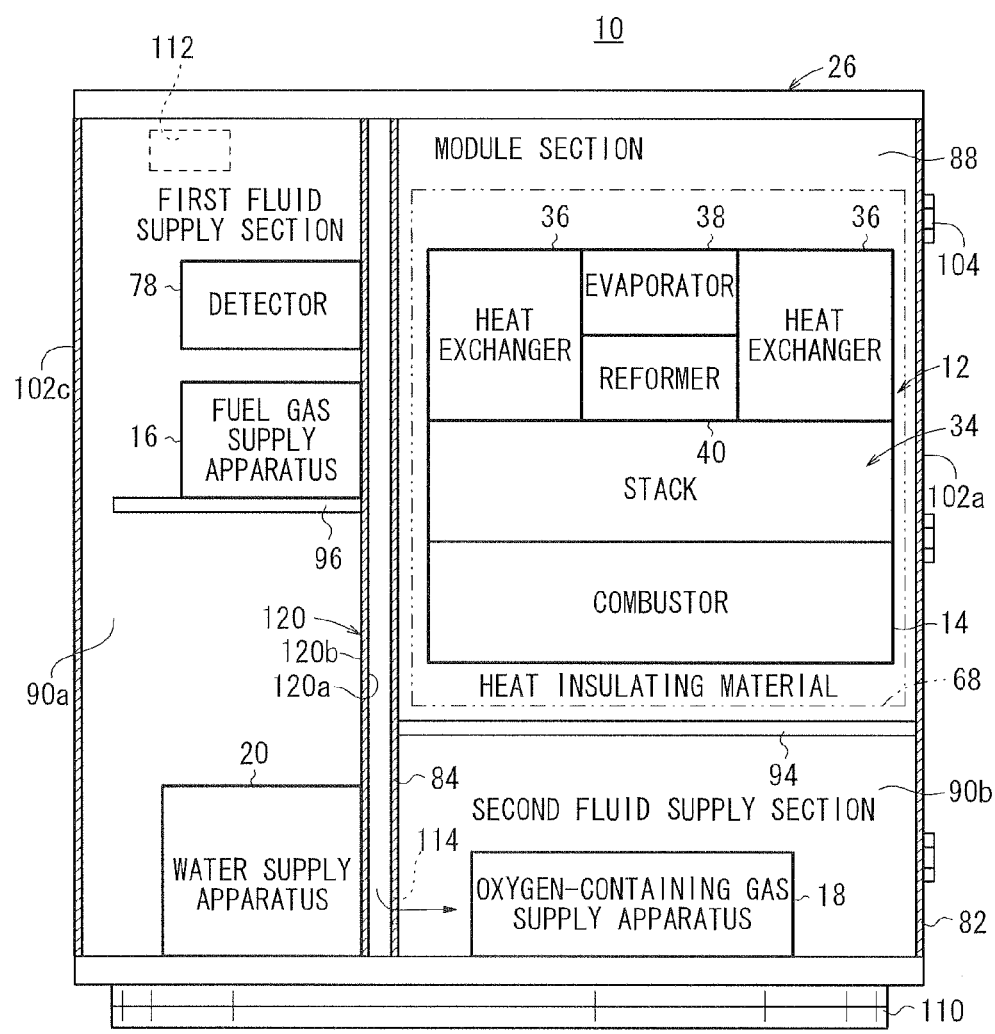
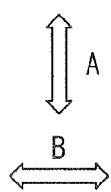

F I G. 5

| DISTANCE L2:L1 | ← | 10:1 | ? | 8:3 | ? | 6:5 | →  1:1 |
|---|---|---|---|---|---|---|---|
| WALL SURFACE TEMPERATURE OF INNER PARTITION | ∧ | ∧ | ∧ | MIN | ∨ | ∨ | ∨ |
| RECEIVED HEAT AMOUNT IN WALL SURFACE OF INNER PARTITION | ∧ | ∧ | ∧ | MIN | ∨ | ∨ | ∨ |
| FLOW RATE ON DISTANCE L1 SIDE | MAX | ∧ | ∧ | ∧ | ∧ | ∧ | MIN |
| HEAT EXCHANGE PERFORMANCE | × | △ | ○ | ◎ | ○ | △ | × |
| OVERALL EVALUATION | × | ○ | ○ | ◎ | ○ | ○ | × |

◎ : VERY GOOD
○ : GOOD
△ : OK
× : NOT OK

FUEL CELL SYSTEM

RELATED APPLICATIONS

This application is a 35 U.S.C. 371 national stage filing of International Application No. PCT/JP2009/063544, filed Jul. 30, 2009, which claims priority to Japanese Patent Application No. 2008-229675 filed on Sep. 8, 2008 in Japan. The contents of the aforementioned applications are hereby incorporated by reference.

TECHNICAL FIELD

The present invention relates to a fuel cell system including a fuel cell module, an oxygen-containing gas supply apparatus, a power converter, a control device, and a casing at least containing the fuel cell module, the oxygen-containing gas supply apparatus, the power converter, and the control device.

BACKGROUND ART

Typically, a solid oxide fuel cell (SOFC) employs a solid electrolyte of ion-conductive oxide such as stabilized zirconia. The solid electrolyte is interposed between an anode and a cathode to form an electrolyte electrode assembly. The electrolyte electrode assembly is interposed between separators (bipolar plates). In use, normally, predetermined numbers of the electrolyte electrode assemblies and the separators are stacked together to form a fuel cell stack.

As the fuel gas supplied to the fuel cell, normally, a hydrogen gas produced from hydrocarbon raw material by a reformer is used. In general, in the reformer, a reformed raw material gas is obtained from hydrocarbon raw material of a fossil fuel or the like, such as methane or LNG, and the reformed raw material gas undergoes steam reforming, partial oxidation reforming, or autothermal reforming to produce a reformed gas (fuel gas).

In this regard, a fuel cell system (fuel cell apparatus) having a single unit case containing a fuel cell, a reformer, a power converter for converting direct power electrical energy generated in the fuel cell according to a power supply output specification, a control device, and auxiliary devices is known.

In particular, in the case where a high temperature fuel cell (such as a solid oxide fuel cell or a molten carbonate fuel cell) or a medium temperature fuel cell (such as a phosphoric acid fuel cell and a hydrogen membrane fuel cell) is used, the temperature in the unit case tends to be considerably high. However, the temperature of the atmosphere around the power converter, the control device, and the auxiliary devices needs to be maintained at relatively low temperature for preventing degradation in the performance and reduction in the product life.

For example, in a packaged fuel cell power generator apparatus disclosed in Japanese Laid-Open Patent Publication No. 04-075263, as shown in FIG. 20, a package 1 is provided. The package 1 includes an upstream side package chamber 1A and a downstream side package chamber 1B. The upstream side package chamber 1A has a ventilation fan 3 at an intake port for intake of the external air. The downstream side package chamber 1B is connected to a ventilation discharge port of the upstream side package chamber 1A through a coupling duct 1C.

The upstream side package chamber 1A contains therein a power converter unit 4 including a chopper 4A, an inverter 4B and a controller 4C. The downstream side package chamber 1B contains therein a fuel cell unit 8 including a fuel cell 5, a reactant air blower 6A, a combustion air blower 6B, and a fuel reformer 7.

The air at normal temperature supplied into the upstream side package chamber 1A by the ventilation fan 3 cools the power converter unit 4 by ventilation, and then, the air is supplied to the downstream side package chamber 1B through the coupling duct 1C. After the air is used for cooling and ventilation of the fuel cell unit 8, the air is discharged to the outside through an exhaust port 9.

Further, in a ventilating structure of a packaged fuel cell power generator apparatus disclosed in Japanese Laid-Open Patent Publication No. 05-290868, as shown in FIG. 21, a package 1a is provided. The space in the package 1a is divided by a heat insulating partition 3a having a ventilation hole 2a into a high temperature device chamber 4a and an electrical device chamber 4b. There is formed a ventilation port 5a for intake of the external air, on the outer wall of the electrical device chamber 4b. The high temperature device chamber 4a contains therein a fuel cell 6a and a fuel cell reformer 7a.

The high temperature device chamber 4a contains therein a reactant air blower 6b connected to the fuel cell 6a, and the electrical device chamber 4b contains therein a fuel air blower 7b connected to the fuel cell reformer 7a. The electrical device chamber 4b contains therein a power converter 8a, a measurement controller 8b, auxiliary devices 8c, and a raw fuel tank 8d. It is required to control the temperature of the atmosphere around these devices in the electrical device chamber 4b.

In this package 1a, in the presence of the heat insulating partition 3a, the electrical device chamber 4b is not influenced by the heat from the high temperature device chamber 4a. Further, according to the disclosure, the external air at normal temperature is sucked through the ventilation port 5a into the electrical device chamber 4b for forced ventilation in the electrical device chamber 4b to lower the temperature of the atmosphere around the power converter 8a, the measurement controller 8b, the auxiliary devices 8c, the raw fuel tank 8d or the like.

SUMMARY OF INVENTION

In Japanese Laid-Open Patent Publication No. 04-075263, the fuel cell 5, the reactant air blower 6A, and the combustion air blower 6B are placed in the downstream side package chamber 1B. Therefore, in particular, in the case where a high temperature fuel cell is used, the optimum layout of the devices in the fuel cell system cannot be achieved depending on the operating temperature ranges and functions. Further, heat management and fluid management such as heat insulation and prevention of fluid diffusion or the like are not performed sufficiently.

Further, in Japanese Laid-Open Patent Publication No. 05-290868, the raw fuel tank 8d is placed in the electrical device chamber 4b. Therefore, in particular, in the case where the high temperature fuel cell is used, the optimum layout of the devices in the fuel cell system cannot be achieved depending on the operating temperature ranges and functions. Further, the high temperature device chamber 4a is directly connected to the electrical device chamber 4b, and heat management and fluid management such as heat insulation and prevention of fluid diffusion or the like are not performed sufficiently.

The present invention has been made to solve the problems of this type, and an object of the present invention is to provide a fuel cell system having a relatively simple structure in which the maintenance operation can be carried out easily, respective devices are arranged depending on the operating temperature ranges and the functions to minimize diffusion of heat and fluid and to prevent heat influence on the devices that should be operated at relatively low temperature as much as possible, improvement in the operating efficiency is achieved by effectively recovering heat radiated from the devices.

The present invention relates to a fuel cell system including a fuel cell module for generating electrical energy by electrochemical reactions of a fuel gas and an oxygen-containing gas, an oxygen-containing gas supply apparatus for supplying the oxygen-containing gas to the fuel cell module, a power converter for converting direct current electrical energy generated in the fuel cell module to electrical energy according to requirements specification, a control device for controlling the amount of electrical energy generated in the fuel cell module, and a casing containing at least the fuel cell module, the oxygen-containing gas supply apparatus, the power converter, and the control device.

The casing is divided into a module section where the fuel cell module is provided, a fluid supply section where the oxygen-containing gas supply apparatus is provided, and an electrical equipment section where the power converter and the control device are provided.

The electrical equipment section has a first air intake port for sucking the oxygen-containing gas from the outside of the casing into the electrical equipment section. The fluid supply section has a second air intake port for sucking the oxygen-containing gas sucked through the first air intake port into the oxygen-containing gas supply apparatus. The casing contains therein an inner partition that forms a detour channel for preventing the oxygen-containing gas from flowing straight from the first air intake port to the second air intake port.

In the present invention, the space in the casing is divided into the module section where the fuel cell module is provided, the fluid supply section where the oxygen-containing gas supply apparatus is provided, and the electrical equipment section where the power converter and the control device are provided. In the structure, the space in the casing is divided depending on the operating temperatures and functions, thereby to minimize diffusion of heat and fluid. In terms of functionality, the optimum layout is achieved advantageously.

Further, the fluid supply section forms part of an outer wall of the casing. Accordingly, the fluid supply section is cooled efficiently, and does not become hot easily. Likewise, the electrical equipment section forms part of the outer wall of the casing. Accordingly, the electrical equipment section is cooled efficiently, and does not become hot easily. Thus, heat influence on the devices that should be used at low temperature, such as the fluid supply section containing pumps and the electrical equipment section containing the control device is prevented as much as possible. The desired functions of devices are maintained, and the devices are operated reliably.

Further, the inner partition is provided in the casing in order to form the detour channel for preventing the oxygen-containing gas from flowing straight from the first air intake port to the second air intake port. In the structure, the oxygen-containing gas (cool air), which is external atmosphere that has been suctioned from the outside of the casing into the electrical equipment section through the first air intake port, can effectively recover heat radiated from devices in the electrical equipment section, such as the power generator and the control device.

Further, the oxygen-containing gas heated by recovering the radiated heat (heated air) is sucked from the electrical equipment section into the fluid supply section through the second air intake port. In the structure, it becomes possible to supply the heated oxygen-containing gas to the fuel cell module. Thus, the efficiency of operating the fuel cell module can be improved.

Further, since the detour channel is formed by the inner partition, the oxygen-containing gas channel in the casing becomes longer. Thus, natural convection is suppressed and forced convection is facilitated in the electrical equipment section and the fluid supply section (low temperature sections), and rise in the temperatures of the low temperature sections can be suppressed.

Further, since the external atmosphere, i.e., the air is directly supplied to the respective devices in the electrical equipment section through the first air intake port, rise in the temperatures of the devices can be suppressed effectively.

BRIEF DESCRIPTION OF DRAWINGS

FIG. 3 is a front view showing the fuel cell system;

FIG. 5 is a table showing a state where an inner partition is provided in a casing of the fuel cell system;

DESCRIPTION OF EMBODIMENTS

Figure 1:
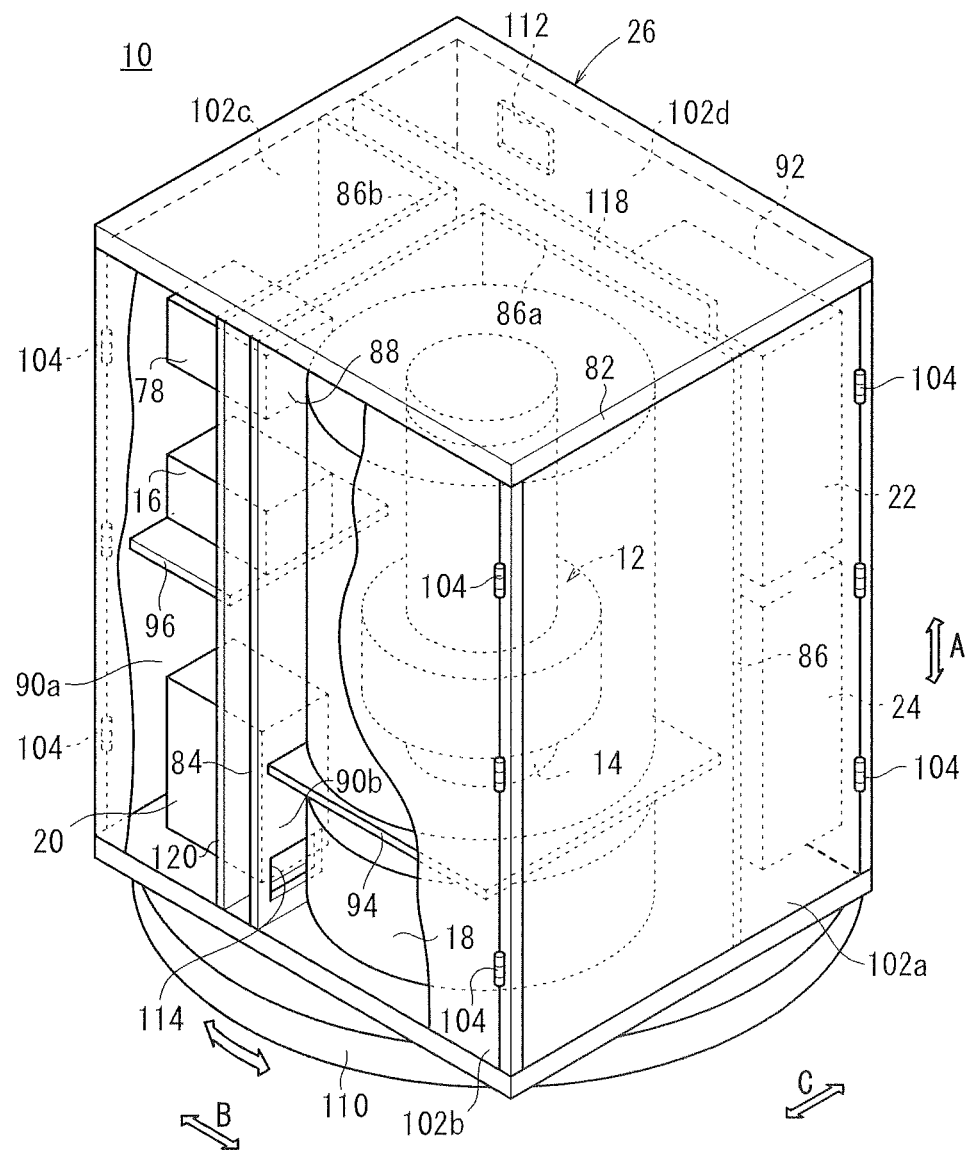
FIG. 1 is a perspective view schematically showing a fuel cell system according to a first embodiment of the present invention.
Figure 2:
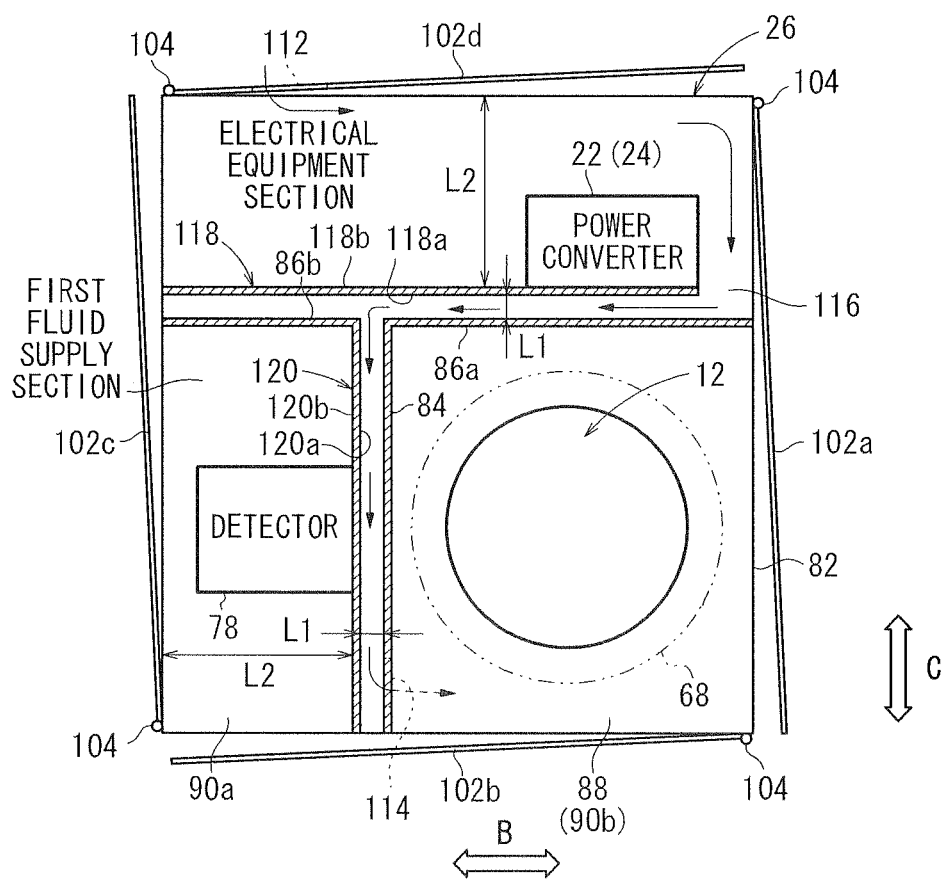
FIG. 2 is a plan view showing the fuel cell system.

As shown in FIGS. 1 to 3, a fuel cell system 10 according to a first embodiment of the present invention is used in various applications, including stationary and mobile applications. For example, the fuel cell system 10 is mounted on a vehicle. The fuel cell system 10 includes a fuel cell module 12 for generating electrical energy in power generation by electrochemical reactions of a fuel gas (hydrogen gas) and an oxygen-containing gas (air), a combustor 14 for raising the temperature of the fuel cell module 12, a fuel gas supply apparatus (including a fuel gas pump) 16 for supplying the fuel gas to the fuel cell module 12, an oxygen-containing gas supply apparatus (including an air pump) 18 for supplying an oxygen-containing gas to the fuel cell module 12, a water supply apparatus (including a water pump) 20 for supplying water to the fuel cell module 12, a power converter 22 for converting the direct current electrical energy generated in the fuel cell module 12 to electrical energy according to the requirements specification, and a control device 24 for controlling the amount of electrical energy generated in the fuel cell module 12. The fuel cell module 12, the combustor 14, the fuel gas supply apparatus 16, the oxygen-containing gas supply apparatus 18, the water supply apparatus 20, the power converter 22, and the control device 24 are disposed in a single casing 26.

Figure 4:
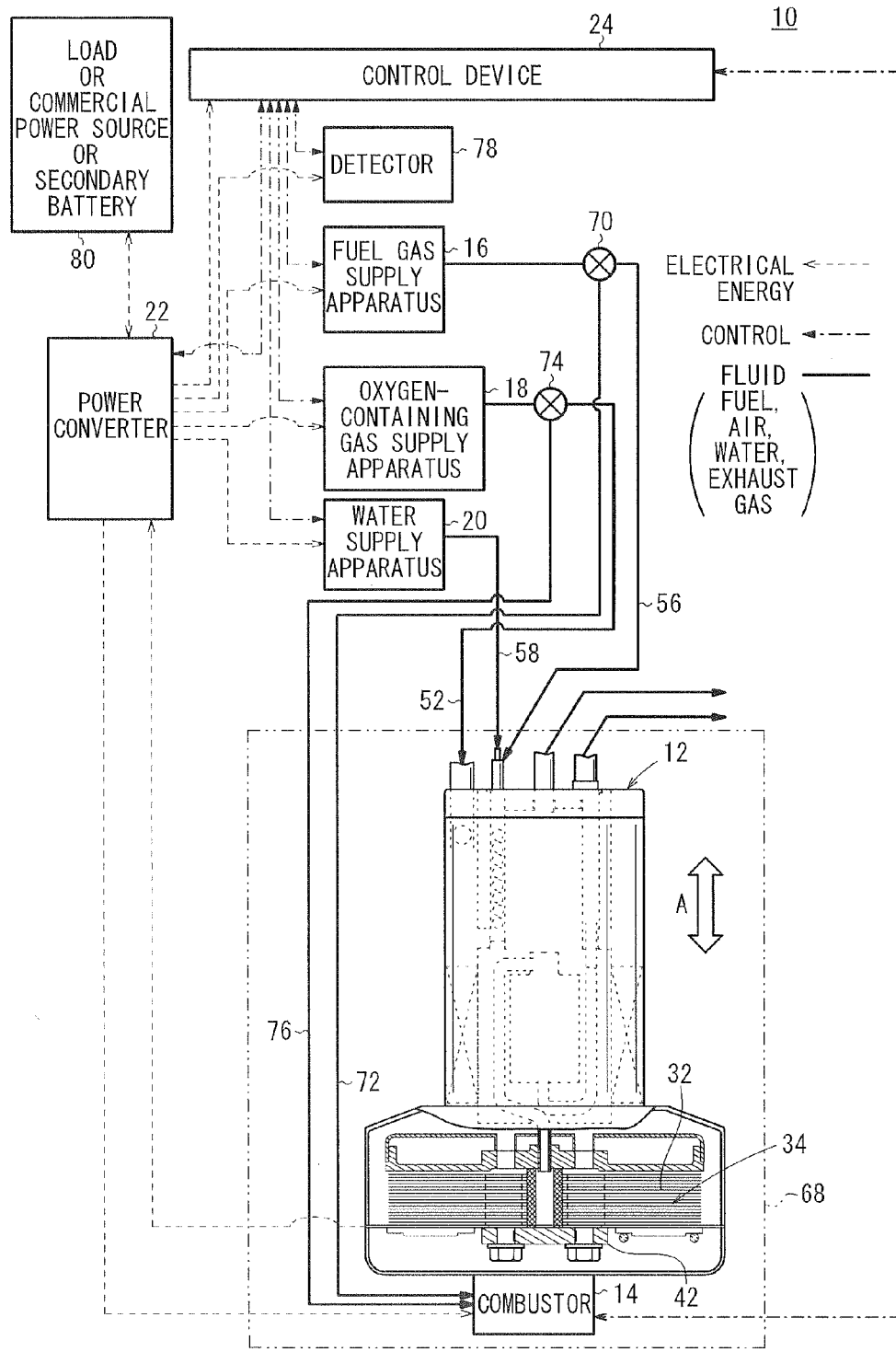
FIG. 4 is a circuit diagram showing the fuel cell system.

As shown in FIG. 4, the fuel cell module 12 includes a fuel cell stack 34 formed by stacking a plurality of solid oxide fuel cells 32 in a vertical direction. The fuel cells 32 are formed by stacking electrolyte electrode assemblies and separators. Though not shown, each of the electrolyte electrode assemblies includes a cathode, an anode, and a solid electrolyte (solid oxide) interposed between the cathode and the anode. For example, the electrolyte is made of ion-conductive solid oxide such as stabilized zirconia.

As shown in FIG. 3, at an upper end of the fuel cell stack 34 in the stacking direction, a heat exchanger 36 for heating the oxygen-containing gas by heat-exchange with a consumed reactant gas discharged from the fuel cell stack 34 before the oxygen-containing gas is supplied to the fuel cell stack 34, an evaporator 38 for evaporating water to produce a mixed fuel of a raw fuel (e.g., city gas) chiefly containing hydrocarbon and water vapor, and a reformer 40 for reforming the mixed fuel to produce a reformed gas are provided.

At a lower end of the fuel cell stack 34 in the stacking direction, a load applying mechanism 42 for applying a tightening load to the fuel cells 32 of the fuel cell stack 34 in the stacking direction indicated by the arrow A is provided (see FIG. 4).

The reformer 40 is a preliminary reformer for reforming higher hydrocarbon ($C_{2+}$) such as ethane ($C_2H_6$), propane ($C_3H_6$), and butane ($C_4H_{10}$) contained in the city gas, into raw fuel gas chiefly containing methane ($CH_4$), by steam reforming. The operating temperature of the reformer 40 is several hundred ° C.

The operating temperature of the fuel cell 32 is high, at several hundred ° C. In the electrolyte electrode assembly, methane in the fuel gas is reformed to obtain hydrogen, and the hydrogen is supplied to the anode. The fuel cell module 12 and the combustor 14 are surrounded by heat insulating material 68 (see FIG. 3).

As shown in FIG. 4, the fuel gas supply apparatus 16 is connected to a raw fuel channel 56, and a raw fuel branch channel 72 is provided at a position in the middle of the raw fuel channel 56 through a switching valve 70. The raw fuel branch channel 72 is connected to the combustor 14.

The oxygen-containing gas supply apparatus 18 is connected to the air supply pipe 52, and the air branch channel 76 is connected to a switching valve 74 provided at a position in a middle of the air supply pipe 52. The air branch channel 76 is connected to the combustor 14. For example, the combustor 14 has a burner, and as described above, the raw fuel and the air are supplied to the combustor 14. Instead of the burner, other means (e.g., electric heater) may be adopted. In this case, the raw fuel, the air, and electricity should be supplied selectively as necessary.

The water channel 58 is connected to the water supply apparatus 20. The fuel gas supply apparatus 16, the oxygen-containing gas supply apparatus 18, and the water supply apparatus 20 are controlled by the control device 24. A detector 78 for detecting the fuel gas is electrically connected to the control device 24. For example, a commercial power source 80 (or other components such as a load or a secondary battery) is connected to the power converter 22.

As shown in FIGS. 1 to 3, the casing 26 includes an outer frame 82 having a rectangular shape as a whole. In the outer frame 82, a first vertical partition plate 84 and second vertical partition plates 86a, 86b are provided. The first vertical partition plate 84 divides the space in the casing 26 in a horizontal direction indicated by the arrow B. The second vertical partition plates 86a, 86b divide the space in the casing 26 in a horizontal direction indicated by the arrow C (in the direction intersecting with the direction indicated by the arrow B).

As shown in FIGS. 1 and 2, the module section 88 has a rectangular shape (polygonal shape) in a plan view, and includes the first vertical partition plate 84 as a first side surface and the second vertical partition plate 86a as a second side surface on both sides of one corner. There is provided a first fluid supply section 90a between the first vertical partition plate 84 and the outer frame 82. Also, there is provided an electrical equipment section 92 between the second vertical partition plates 86a, 86b and the outer frame 82. Thus, the first fluid supply section 90a and the electrical equipment section 92 partially form an outer wall of the casing 26. Further, there is disposed a second fluid supply section 90b under the module section 88, i.e., under a lateral partition plate 94.

As shown in FIGS. 1 and 3, the fuel cell module 12 and the combustor 14 are disposed in the module section 88. The fuel cell module 12 is provided above the combustor 14. It should be noted that the fuel cell module 12 may be provided under the combustor 14. The fuel cell module 12 and the combustor 14 are surrounded by heat insulating material 68. The power converter 22 and the control device 24 are placed in the electrical equipment section 92. The power converter 22 is provided above the control device 24.

The first fluid supply section 90a contains therein the water supply apparatus 20, the fuel gas supply apparatus 16, and a detector 78. The water supply apparatus 20 is placed at the lowermost position of the first fluid supply section 90a, and the detector 78 is provided above the fuel gas supply apparatus 16. The fuel gas supply apparatus 16 is held on a table 96 in the first fluid supply section 90a. The oxygen-containing gas supply apparatus 18 is placed in the second fluid supply section 90b.

As shown in FIGS. 1 and 2, the casing 26 has a rectangular shape in a plan view. The casing 26 is equipped with a first open/close door 102a, a second open/close door 102b, a third open/close door 102c, and a fourth open/close door 102d on side surfaces of the casing 26. Each of the first to fourth open/close doors 102a to 102d can be opened or closed at one end, with respect to the outer frame 82 of the casing 26 through hinges 104.

The first open/close door 102a partially opens/closes the module section 88, the second fluid supply section 90b, and the electrical equipment section 92. The second open/close door 102b partially opens/closes the module section 88, the second fluid supply section 90b, and the first fluid supply section 90a. The third open/close door 102c partially opens/closes the first fluid supply section 90a and the electrical equipment section 92. Further, the fourth open/close door 102d partially opens/closes the electrical equipment section 92.

As shown in FIGS. 1 and 3, the casing 26 is rotatable about a vertical axis through a rotation mechanism 110. The rotation mechanism 110 has, for example, a known structure such as a rotation table.

In the first embodiment, the electrical equipment section 92 has a first air intake port 112 for sucking the oxygen-containing gas from the outside of the casing 26 into the electrical equipment section 92. Further, the second fluid supply section 90b has a second air intake port 114 for sucking the oxygen-containing gas sucked through the first air intake port 112, into the oxygen-containing gas supply apparatus 18.

The fourth open/close door 102d has the first air intake port 112 at an upper portion of the electrical equipment section 92 and on a side spaced from the power converter 22 and the control device 24. The second air intake port 114 is positioned at a lower portion of the first vertical partition plate 84, and the first air intake port 112 is provided above the second air intake port 114.

There are provided a first inner partition 118 and a second inner partition 120 in the casing 26. The first inner partition 118 and the second inner partition 120 form a detour channel 116 for preventing the oxygen-containing gas from flowing straight from the first air intake port 112 to the second air intake port 114. As shown in FIG. 2, the first inner partition 118 is provided in the electrical equipment section 92, in parallel with the second vertical partition plates 86a, 86b. There is formed a clearance between the first inner partition 118 and the first open/close door 102a to form the detour channel 116.

The distance L1 between one wall surface 118a of the first inner partition 118 and the second vertical partition plate 86a as a wall surface of the module section 88 is smaller than the distance L2 between the fourth open/close door 102d as a wall surface on a side opposite to the module section 88 and the other wall surface 118b of the first inner partition 118 (L1<L2).

Devices in the electrical equipment section 98, i.e., the power converter 22 and the control device 24 are attached to the other wall surface 118b of the first inner partition 118. The second inner partition 120 is provided in the first fluid supply section 90a in parallel with the first vertical partition plate 84. An end of the second inner partition 120 is connected to the second vertical partition plate 86b.

The distance L1 between one wall surface 120a of the second inner partition 120 and the first vertical partition plate 84 as a wall surface of the module section 88 is smaller than the distance L2 between the third open/close door 102c as a wall surface on a side opposite to the module section 88 and the other wall surface 120b of the second inner partition 120 (L1<L2). The water supply apparatus 20, the fuel gas supply apparatus 16, and the detector 78 are attached to the other wall surface 120b of the second inner partition 120.

The first inner partition 118 and the second inner partition 120 are made of insulating material (material having low heat conductivity). For this heat insulating material (member), for example, rubber material such as Bakelite or nitrile butadiene rubber, resin material, fiberglass molded member or Honeycomb structure member may be used. At least in the first inner partition 118, the ratios between the distance L1 and the distance L2 (L1:L2) is determined to be within a range of 1:10 to 5:6.

Operation of the fuel cell system 10 will be described below.

As shown in FIG. 4, by operation of the fuel gas supply apparatus 16, for example, a raw fuel such as the city gas (including $CH_4$, $C_2H_6$, $C_3H_8$, $C_4H_{10}$) is supplied to the raw fuel channel 56. Further, by operation of the water supply apparatus 20, water is supplied to the water channel 58, and by operation of the oxygen-containing gas supply apparatus 18, the oxygen-containing gas such as the air is supplied to the air supply pipe 52.

As shown in FIG. 3, in the evaporator 38, the raw fuel flowing through the raw fuel channel 56 is mixed with the water vapor, and a mixed fuel is obtained. The mixed fuel is supplied to the inlet of the reformer 40. The mixed fuel undergoes steam reforming in the reformer 40. Thus, hydrocarbon of $C_{2+}$ is removed (reformed), and a reformed gas (fuel gas) chiefly containing methane is obtained. The reformed gas flows through the outlet of the reformer 40, and the reformed gas is supplied to the fuel cell stack 34. Thus, the methane in the reformed gas is reformed, and the hydrogen gas is obtained. The fuel gas chiefly containing the hydrogen gas is supplied to the anodes (not shown).

The air supplied from the air supply pipe 52 to the heat exchanger 36 moves along the heat exchanger 36, and is heated to a predetermined temperature by heat exchange with the exhaust gas as described later. The air heated by the heat exchanger 36 is supplied to the fuel cell stack 34, and the air is supplied to the cathodes (not shown).

Thus, in each of the electrolyte electrode assemblies, by electrochemical reactions of the fuel gas and the air, power generation is performed. The hot exhaust gas (several hundred ° C.) discharged to the outer circumferential region of each of the electrolyte electrode assemblies flows through the heat exchanger 36, and heat exchange with the air is carried out. The air is heated to a predetermined temperature, and the temperature of the exhaust gas is decreased.

In the first embodiment, the space in the casing 26 is divided into the module section 88 containing the fuel cell module 12, the second fluid supply section 90b where the oxygen-containing gas supply apparatus 18 is provided, and the electrical equipment section 92 where the power converter 22 and the control device 24 are provided. That is, the space in the casing 26 is divided depending on the operating temperatures and the functions. In the structure, diffusion of heat and fluid is minimized. In terms of functionality, the optimum layout of the devices in the fuel cell system can be achieved.

Further, the second fluid supply section 90b is positioned under the lower surface (lateral partition plate 94) of the module section 88. Since the second fluid supply section 90b partially forms a lower wall (outer wall) of the casing 26, the second fluid supply section 90b is cooled efficiently, and does not become hot easily.

Further, the first fluid supply section 90a is provided on a first side surface (first vertical partition plate 84) of the module section 88. Since the first fluid supply section 90a partially form the outer wall of the casing 26, the first fluid supply section 90a is cooled efficiently, and does not become hot easily.

Likewise, the electrical equipment section 92 is provided on a second side surface (second vertical partition plates 86a, 86b) of the module section 88. Since the electrical equipment section 92 partially forms the outer wall of the casing 26, the electrical equipment section 92 is cooled efficiently, and does not become hot easily.

The temperatures of the electrical equipment section 92 containing the control device 24 and the second fluid supply section 90b containing the pumps need to be maintained at low temperature (around 40° C.). In the structure, functions of the devices in the electrical equipment section 92 and the second fluid supply section 90b are maintained suitably, and the devices are operated reliably.

Further, in the first embodiment, the first air intake port 112 for sucking the oxygen-containing gas (external air) from the outside of the casing 26 is provided in the electrical equipment section 92, and the second air intake port 114 for sucking the oxygen-containing gas sucked through the first air intake port 112 into the oxygen-containing gas supply apparatus 18 is provided in the second fluid supply section 90b. The first inner partition 118 and the second inner partition 120 are provided in the casing 26, and the first inner partition 118 and the second inner partition 120 form the detour channel 116 in the casing 26. The detour channel 116 prevents the oxygen-containing gas from flowing straight from the first air intake port 112 to the second air intake port 114.

In the structure, the oxygen-containing gas sucked from the outside of the casing 26 to the electrical equipment section 92 through the first air intake port 112 can effectively recover heat radiated from the power converter 22 and the control device 24 in the electrical equipment section 92. Then, after the oxygen-containing gas is heated by recovering the radiated heat, the heated oxygen-containing gas from the electrical equipment section 92 flows through the detour channel 116, and the oxygen-containing gas is sucked through the second air intake port 114 into the second fluid supply section 90b. Thus, by the sucking action of the oxygen-containing gas supply apparatus 18, the heated oxygen-containing gas is supplied to the fuel cell module 12, and improvement in the efficiency of operating the fuel cell module 12 is achieved.

Further, in the casing 26, the detour channel 116 is formed by the first inner partition 118 and the second inner partition 120. Therefore, the oxygen-containing gas channel in the casing 26 becomes longer, and as a result, natural convection is suppressed and forced convection is facilitated in the low temperature sections, i.e., the electrical equipment section 92 and the second fluid supply section 90b. Thus, the low temperature sections effectively do not become hot excessively.

Further, the oxygen-containing gas (fresh air) in the outside atmosphere can be supplied directly to the power converter 22 and the control device 24 in the electrical equipment section 92 through the first air intake port 112. Thus, rise in temperatures of the power converter 22 and the control device 24 is suppressed effectively.

Further, as shown in FIG. 2, the distance L1 between one wall surface 118a of the first inner partition 118 and the second vertical partition plate 86a as a wall surface of the module section 88 is smaller than the distance L2 between the other wall surface 118b of the first inner partition 118 and the fourth open/close door 102d as a wall surface on a side opposite to the module section 88 (L1<L2).

In the structure, the flow rate of the oxygen-containing gas flowing between the second vertical partition plate 86a and the first inner partition 118 is increased. Natural convection is suppressed, and forced convection is facilitated in the electrical equipment section 92. Thus, rise in temperature of the electrical equipment section 92 (low temperature section) is suppressed effectively.

The oxygen-containing gas flowing between the second vertical partition plate 86a and the first inner partition 118 can effectively recover heat radiated from the high temperature section, i.e., the module section 88. Thus, it becomes possible to supply the oxygen-containing gas heated to a high temperature to the fuel cell module 12. Thus, improvement in the efficiency of operating the fuel cell module 12 is achieved.

Further, as shown in FIG. 5, preferably, the ratio between the distance L1 and the distance L2 (L1:L2) is determined to be within a range of 1:10 to 5:6. If the distance L1 is smaller than in the above range, the first inner partition 118 is positioned close to the hot second vertical partition plate 86a. Therefore, heat conductance tends to occur, and the power converter 22 and the control device 24 attached to the first inner partition 118 may be influenced by the heat undesirably.

If the distance L1 is larger than in the above range, the flow rate of the oxygen-containing gas flowing between the second vertical partition plate 86a and the first inner partition 118 becomes considerably small. Therefore, natural convection occurs, and the efficiency in recovering the high heat is lowered, and the power converter 22 and the control device 24 attached to the first inner partition 118 may be influenced by the heat undesirably.

Therefore, by determining the relationship between the distance L1 and the distance L2 to satisfy the above range, natural convection is suppressed, and rise in the temperature of the low temperature section is accordingly suppressed. Further, the efficiency in recovering the radiated heat by the oxygen-containing gas is improved.

In the first embodiment, the power converter 22 and the control device 24 are attached to the other wall surface 118b of the first inner partition 118. Thus, the power converter 22 and the control device 24 are not influenced by the heat radiated from the module section 88 (high temperature section), and rise in the temperatures of the power converter 22 and the control device 24 is suppressed suitably.

Further, since the oxygen-containing gas (fresh air) sucked through the first air intake port 112 is directly supplied to the power converter 22 and the control device 24 in the electrical equipment section 92, rise in the temperature in the power converter 22 and the control device 24 is suppressed further reliably. Further, the second inner partition 120 is provided in the first fluid supply section 90a, and the same advantages as in the case of the electrical equipment section 92 are achieved.

Further, in the electrical equipment section 92, the power converter 22 which radiates a large amount of heat is provided at an upper position of the casing 26, i.e., above the control device 24. In the structure, the control device 24 which radiates a small amount of heat is not influenced by the heat radiated from the power converter 22 having the large amount of heat radiation. Thus, rise in the temperature of the control device 24 is suppressed.

Further, the first air intake port 112 is provided above the second air intake port 114. Thus, the oxygen-containing gas from the outside flows from the first air intake port 112 at the upper position through the detour channel 116, and flows smoothly into the second air intake port 114 at the lower position. Thus, natural convection in the electrical equipment section 92 and the first fluid supply section 90a (low temperature sections) is suppressed, and forced convection is facilitated. Thus, rise in the temperatures in the low temperature sections is suppressed effectively.

Further, the first inner partition 118 is made of heat insulating material. Thus, the power converter 22 and the control device 24 attached to the other wall surface 118b of the first inner partition 118 are not influenced easily by the heat radiated from the module section 88. Thus, rise in the temperatures of the power converter 22 and the control device 24 is suppressed reliably.

It should be noted that the first inner partition 118 may be made of heat conductive material (material having high heat conductivity) instead of heat insulating material. As the heat conductive material, for example, a zinc-coated steel plate, an aluminum plate, a copper plate may be used. Further, it is preferable to increase the contact area between the first inner partition 118 and the power converter 22 and the control device 24 or apply grease or the like to the contact area between the first inner partition 118 and the power converter 22 and the control device 24 for reducing the contact heat resistance. In this manner, heat is radiated from the power converter 22 and the control device 24 through the first inner partition 118. Thus, rise in the temperatures of the power converter 22 and the control device 24 is suppressed advantageously.

Further, the fuel cell module 12 is particularly advantageous when it is a solid oxide fuel cell (SOFC) module used for a high temperature fuel cell system. However, instead of the solid oxide fuel cell module, the present invention is also suitably applicable to the other types of high temperature fuel cell modules and medium temperature fuel cell modules. For example, molten-carbonate fuel cells (MCFC), phosphoric acid fuel cells (PAFC), hydrogen membrane fuel cells (HMFC), and the like can be adopted suitably.

Figure 6:
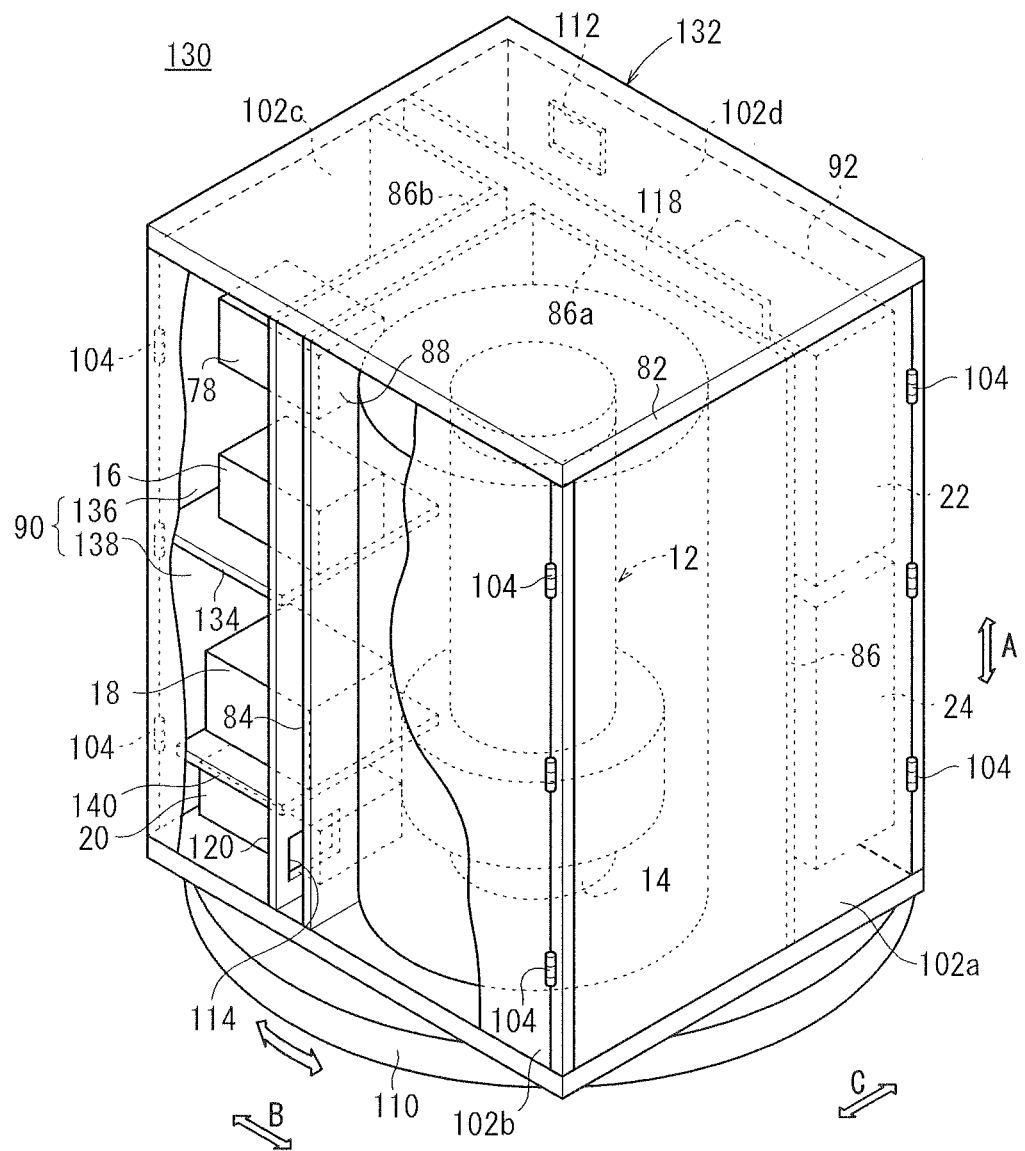
FIG. 6 is a perspective view schematically showing a fuel cell system according to a second embodiment of the present invention.
Figure 7:
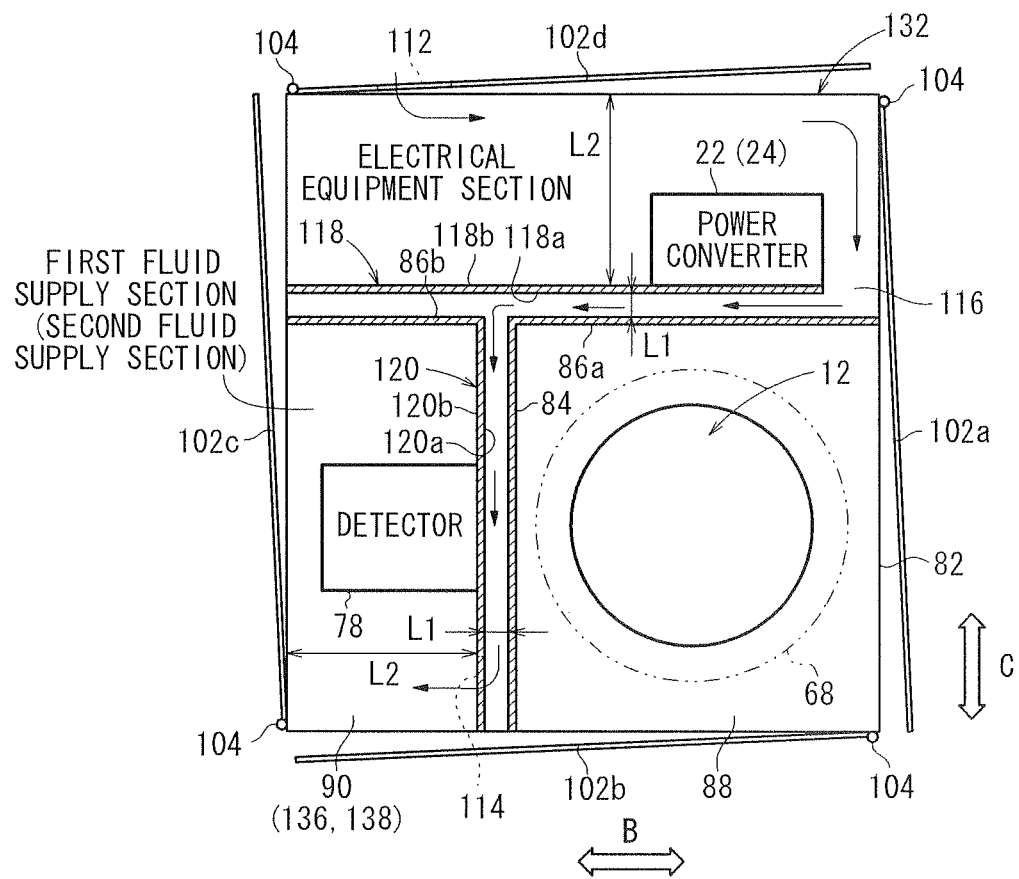
FIG. 7 is a plan view showing the fuel cell system.
Figure 8:
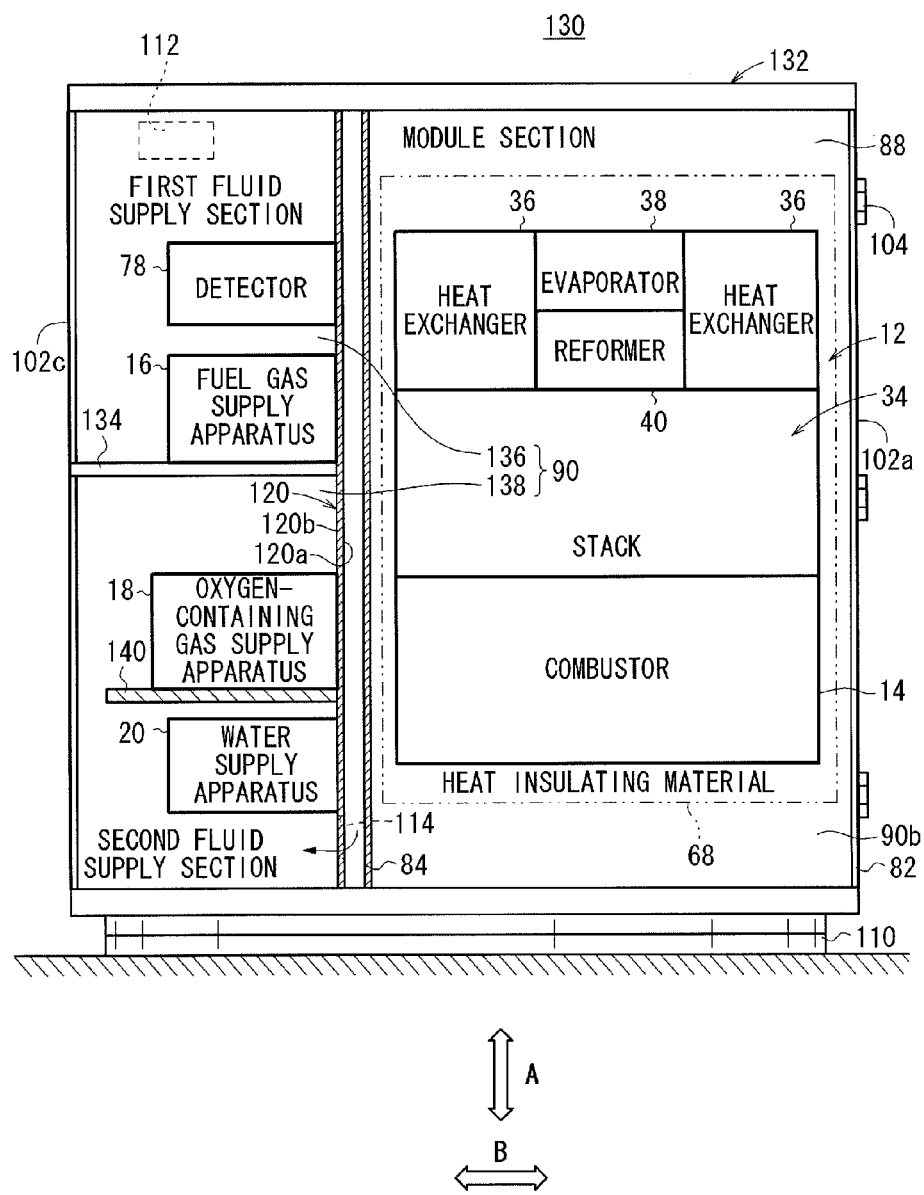
FIG. 8 is a front view showing the fuel cell system.

FIG. 6 is a perspective view schematically showing a fuel cell system 130 according to a second embodiment of the present invention. FIG. 7 is a plan view showing a fuel cell system 130. FIG. 8 is a front view showing the fuel cell system 130.

The constituent elements that are identical to those of the fuel cell system 10 according to the first embodiment are labeled with the same reference numerals, and descriptions thereof will be omitted. Further, also in third to sixth embodiments as described later, the constituent elements that are identical to those of the fuel cell system 10 according to the first embodiment are labeled with the same reference numerals, and descriptions thereof will be omitted.

A fluid supply section 90 is provided between a first vertical partition plate 84 and an outer frame 82 of a casing 132 of the fuel cell system 130. The fluid supply section 90 is vertically divided into two sections, i.e., a first supply section 136 and a second supply section 138 by a lateral partition plate 134. A fuel gas supply apparatus 16 and a detector 78 are placed in the first supply section 136, and the detector 78 is provided above the fuel gas supply apparatus 16. An oxygen-containing gas supply apparatus 18 and a water supply apparatus 20 are placed in the second supply section 138, and the water supply apparatus 20 is provided at the lowermost position of the fluid supply section 90. The oxygen-containing gas supply apparatus 18 is placed on a table 140 in the second supply section 138.

A second inner partition 120 is provided in the fluid supply section 90, and a second air intake port 114 is formed at a lower position of the second inner partition 120. The detector 78, the fuel gas supply apparatus 16, the oxygen-containing gas supply apparatus 18, and the water supply apparatus 20 are attached to the other wall surface 120b of the second inner partition 120.

In the second embodiment, when the oxygen-containing gas supply apparatus 18 is operated, the oxygen-containing gas (external air) is sucked through the first air intake port 112 into the electrical equipment section 92, and the oxygen-containing gas cools the interior of the electrical equipment section 92. Further, after the oxygen-containing gas flows through the detour channel 116, the oxygen-containing gas is sucked through the second air intake port 114 of a second external partition 122 into the fluid supply section 90.

In the structure, the same advantages as in the case of the first embodiment are obtained. In particular, it is possible to prevent the oxygen-containing gas supply apparatus 18 provided in the fluid supply section 90 from being influenced by the heat radiated from the module section 88 as much as possible.

Figure 9:
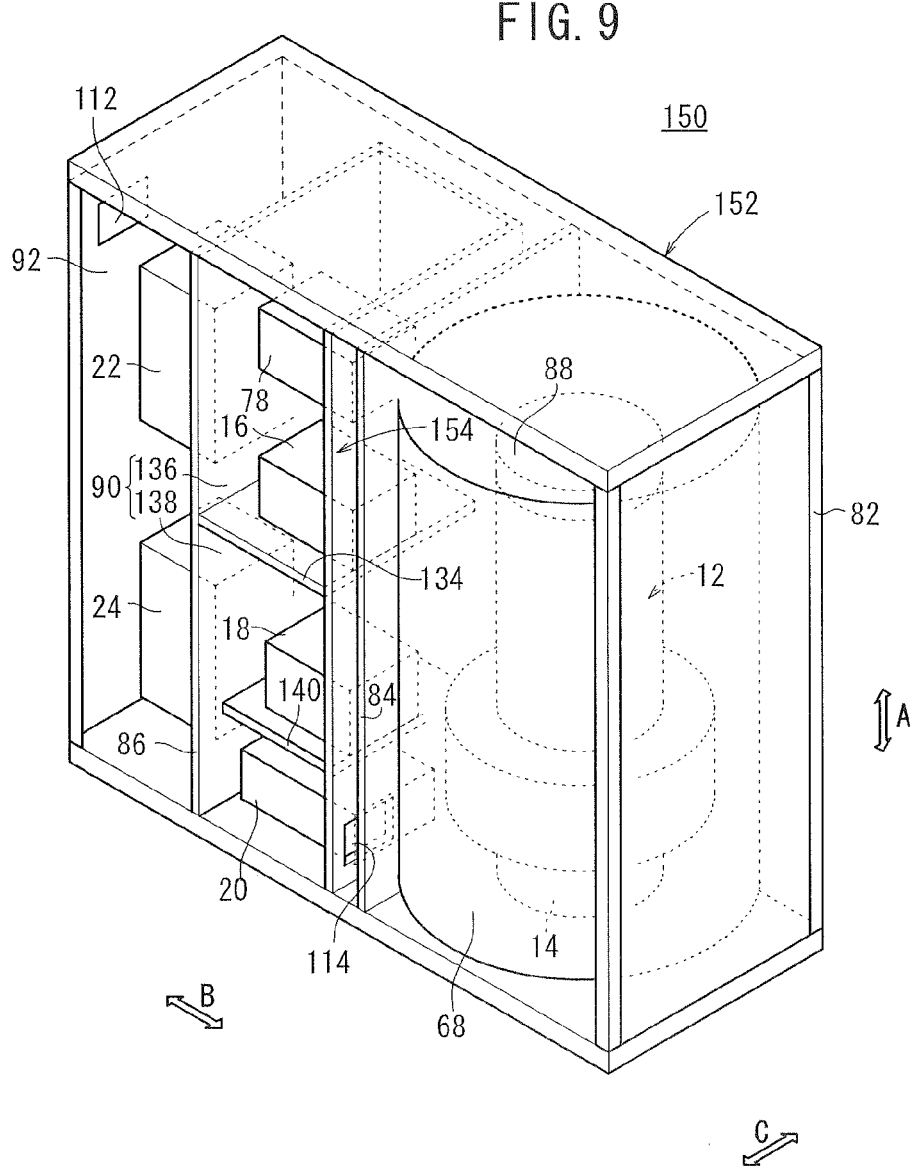
FIG. 9 is a perspective view schematically showing a fuel cell system according to a third embodiment of the present invention.
Figure 10:
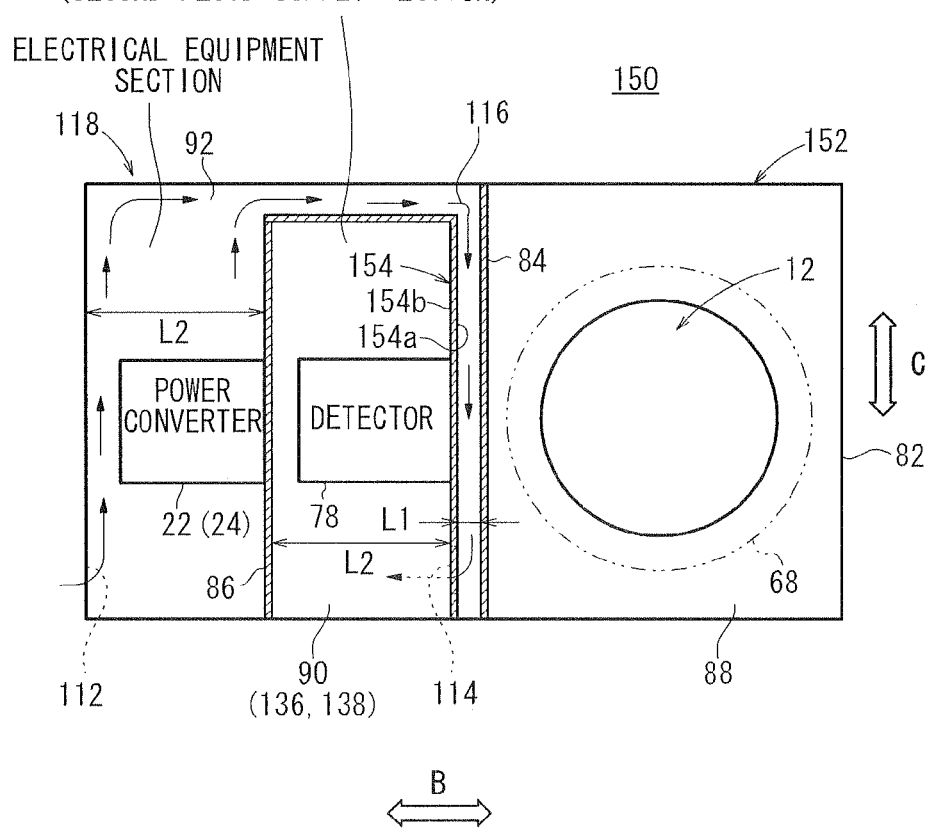
FIG. 10 is a plan view showing the fuel cell system.
Figure 11:
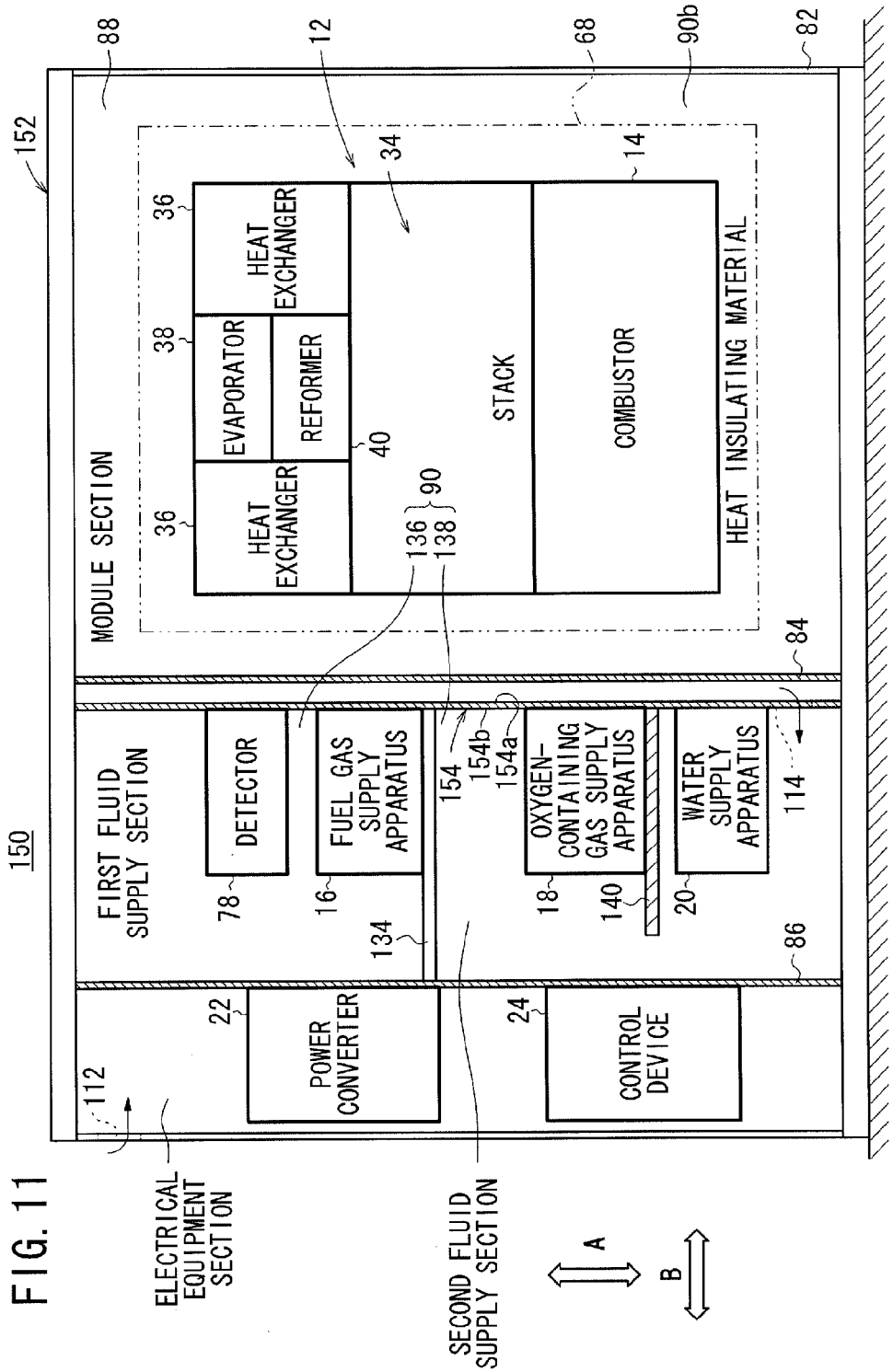
FIG. 11 is a front view showing the fuel cell system.

FIG. 9 is a perspective view schematically showing a fuel cell system 150 according to a third embodiment of the present invention. FIG. 10 is a plan view showing the fuel cell system 150, and FIG. 11 is a front view showing the fuel cell system 150.

The space in a casing 152 of the fuel cell system 150 is divided in a direction indicated by an arrow B by a first vertical partition plate 84 and a second vertical partition plate 86 arranged at a predetermined interval in the direction indicated by the arrow B.

The space in the casing 152 is divided in the direction indicated by the arrow B, into the module section 88, the fluid supply section 90, and the electrical equipment section 92. The fluid supply section 90 is interposed between the module section 88 and the electrical equipment section 92. The fluid supply section 90 has the same structure as in the case of the second embodiment, and the description thereof will be omitted.

An inner partition 154 having a substantially L-shape in a plan view (see FIG. 10) is provided in the fluid supply section 90. The distance L1 between one wall surface 154a of the inner partition 154 and the first vertical partition plate 84 serving as a wall of the module section 88 is smaller than the distance L2 between the other wall surface 154b of the inner partition 154 and the second vertical partition plate 86 (and the distance L2 between the second vertical partition plate 86 and an outer frame 82) (L1<L2).

A first air intake port 112 is provided adjacent to an upper corner of the electrical equipment section 92, and a second air intake port 114 is provided adjacent to a lower corner of the inner partition 154.

In the third embodiment, when the oxygen-containing gas supply apparatus 18 is operated, the external air as the oxygen-containing gas is sucked through the first air intake port 112 into the electrical equipment section 92. After the oxygen-containing gas cools the devices in the electrical equipment section 92, the oxygen-containing gas flows through a detour channel 116 formed on the fluid supply section 90, and the oxygen-containing gas is sucked through the second air intake port 114 into the second supply section 138.

Thus, in particular, the oxygen-containing gas flows suitably and smoothly between the first vertical partition plate 84 and the inner partition 154. Thus, it becomes possible to prevent the devices in the fluid supply section 90 from being influenced by the heat radiated from the module section 88 (high temperature section).

In the third embodiment, as in the cases of the first and second embodiments, open/close doors may be provided on the casing 152. Additionally, rotation tables, traveling wheels or the like may be provided. Further, also in fourth to sixth embodiments, rotation tables, traveling vehicles or the like may be provided.

Figure 12:
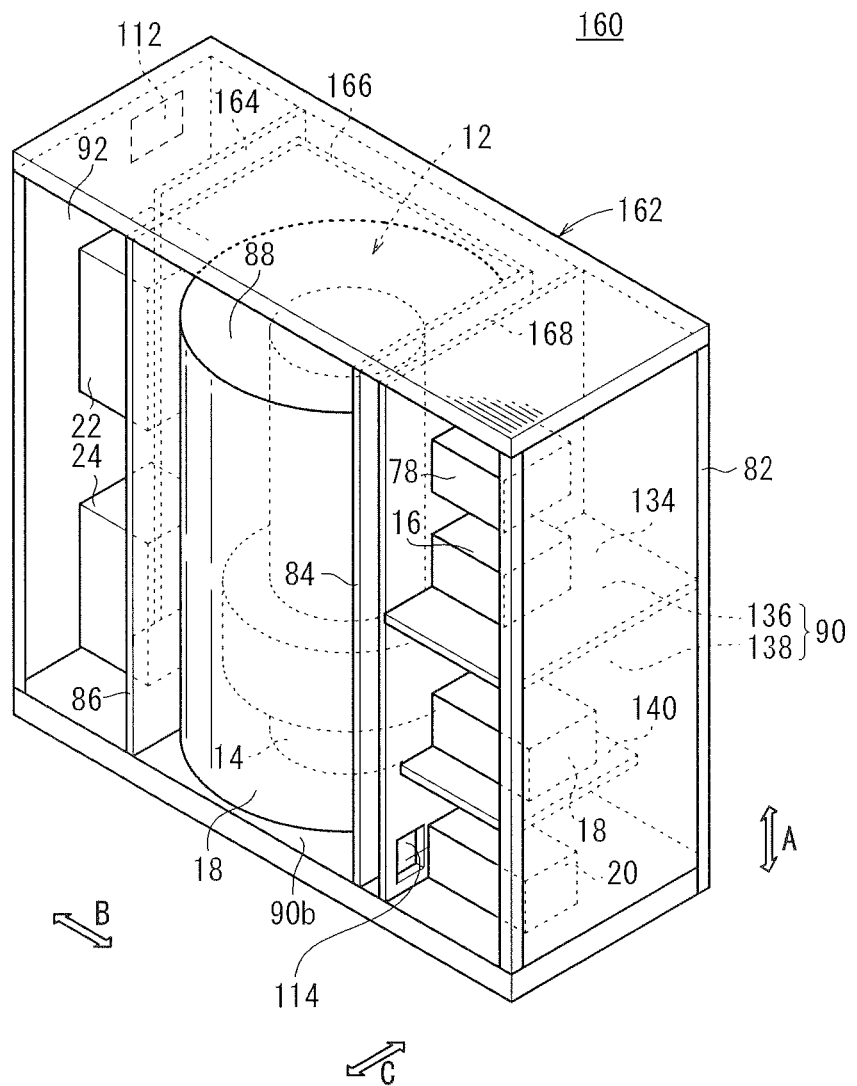
FIG. 12 is a perspective view schematically showing a fuel cell system according to a fourth embodiment of the present invention.
Figure 13:
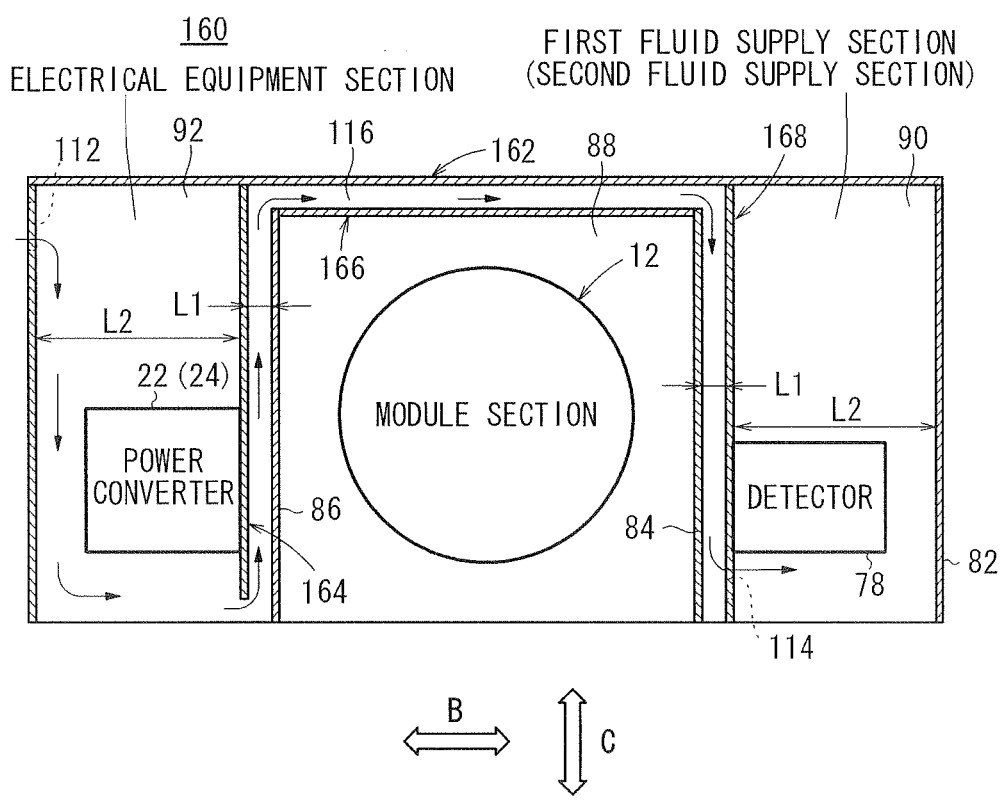
FIG. 13 is a plan view showing the fuel cell system.
Figure 14:
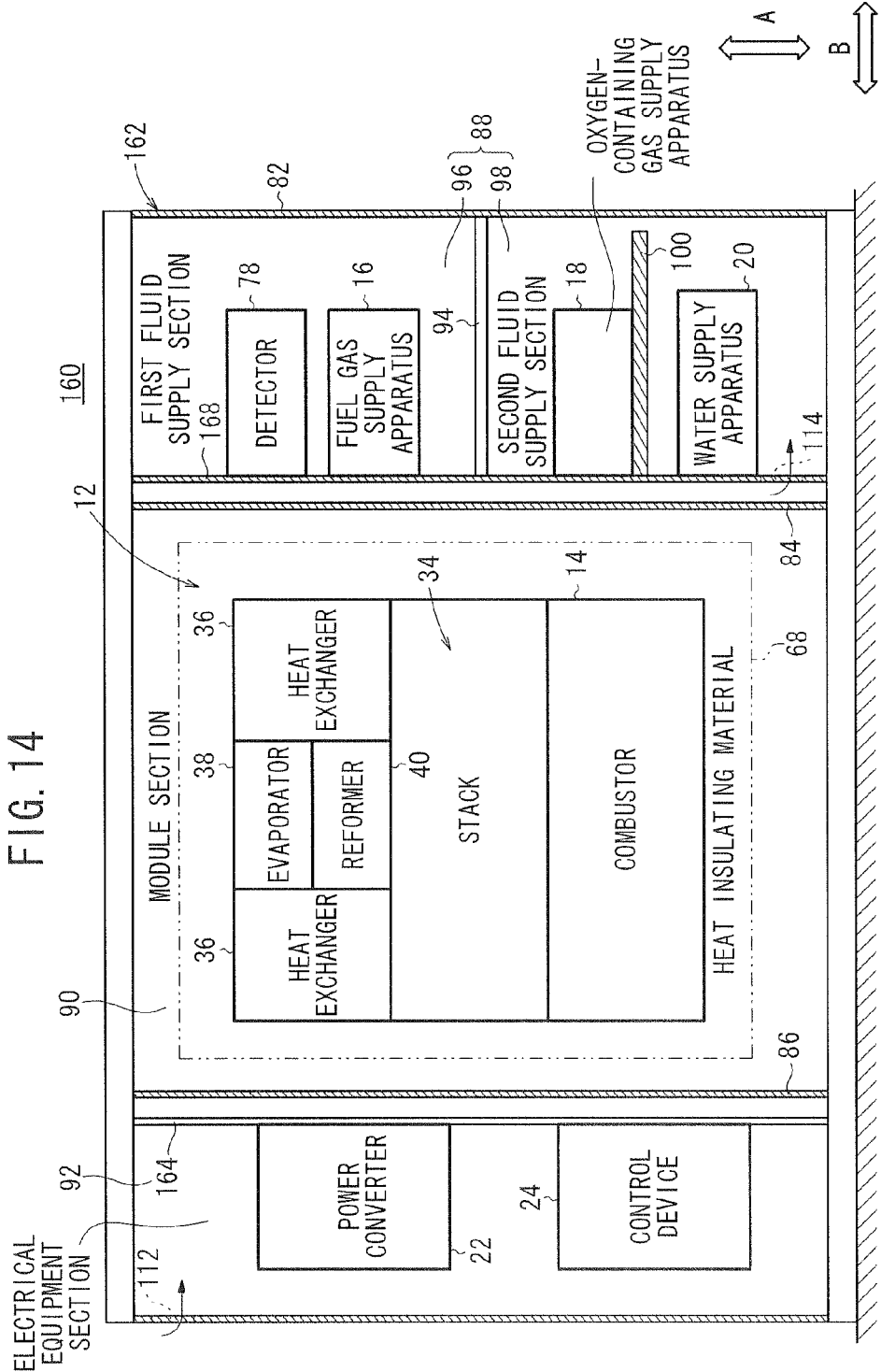
FIG. 14 is a front view showing the fuel cell system.

FIG. 12 is a perspective view schematically showing a fuel cell system 160 according to a fourth embodiment of the present invention. FIG. 13 is a plan view showing the fuel cell system 160, and FIG. 14 is a front view showing the fuel cell system 160.

As in the case of the third embodiment, the space in a casing 162 of the fuel cell system 160 is divided in a direction indicated by an arrow B by a first vertical partition plate 84 and a second vertical partition plate 86. A fluid supply section 90 and an electrical equipment section 92 are provided on both sides of a module section 88 in the direction indicated by the arrow B.

A first inner partition 164 is provided at the electrical equipment section 92 of the casing 162, and a second inner partition 166 is provided at the module section 88 of the casing 162. Further, a third inner partition 168 is provided at the fluid supply section 90. The first inner partition 164 is provided in parallel with the second vertical partition plate 86, and spaced from the second vertical partition plate 86 by the distance L1. One end of the first inner partition 164 is positioned inside the outer frame 82, and partially forms the detour channel 116. The second inner partition 166 extends in the direction indicated by the arrow B, and the second inner partition 166 is connected to the ends of the first vertical partition plate 84 and the second vertical partition plate 86. The third inner partition 168 is provided in parallel with the first vertical partition plate 84, and spaced from the first vertical partition plate 84 by the distance L1.

The distance L2 between the first inner partition 164 and the outer frame 82 in the electrical equipment section 92 is determined, and the distance L2 between the third inner partition 168 and the outer frame 82 in the fluid supply section 90 is determined. A first air intake port 112 is formed at an upper position of the electrical equipment section 92, and a second air intake port 114 is formed at a lower position of the third inner partition 168.

In the fourth embodiment, by operation of the oxygen-containing gas supply apparatus 18, the oxygen-containing gas is sucked through the first air intake port 112 into the electrical equipment section 92, and the oxygen-containing gas flows through the detour channel 116 formed by the first inner partition 164, the second inner partition 166, and the third inner partition 168. Then, the oxygen-containing gas is sucked through the second air intake port 114 into the second supply section 138. Thus, in the fourth embodiment, the same advantages as in the case of the first to third embodiments are obtained.

Figure 15:
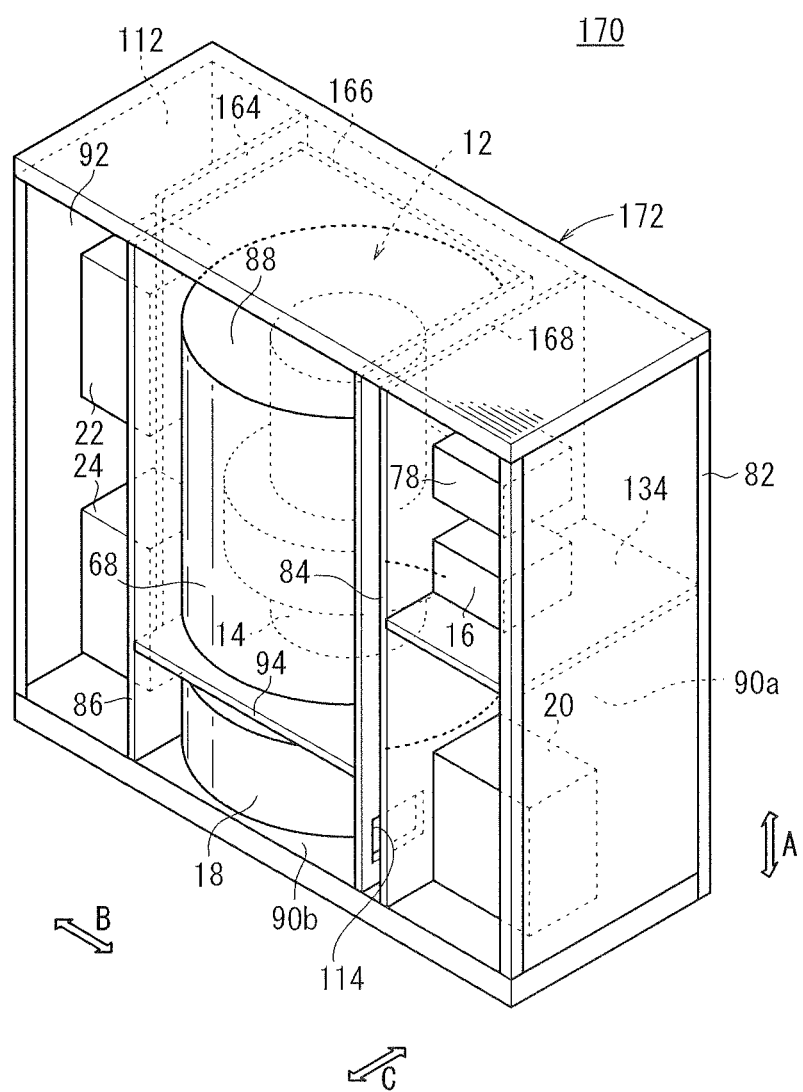
FIG. 15 is a perspective view schematically showing a fuel cell system according to a fifth embodiment of the present invention.
Figure 16:
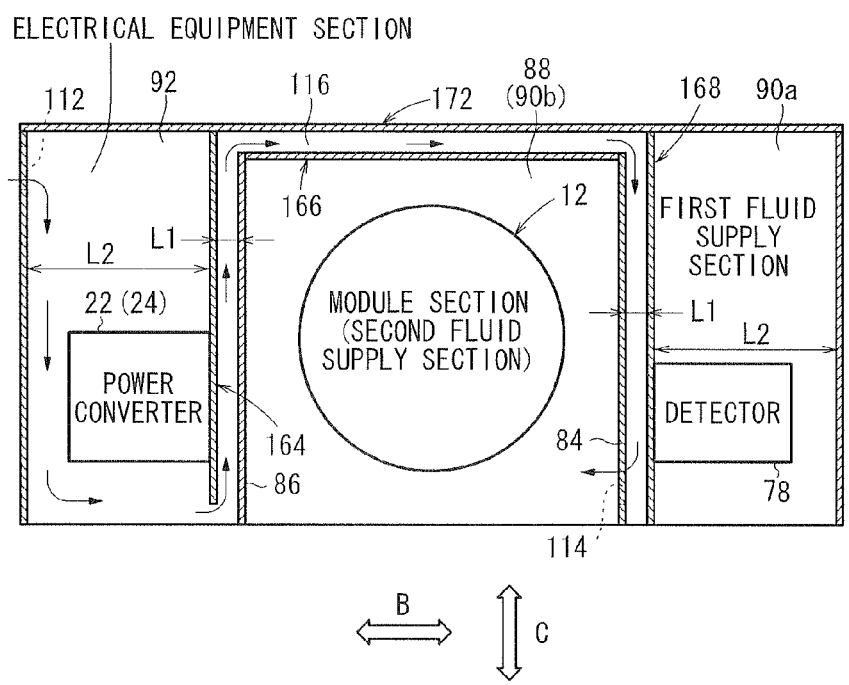
FIG. 16 is a plan view showing the fuel cell system.
Figure 17:
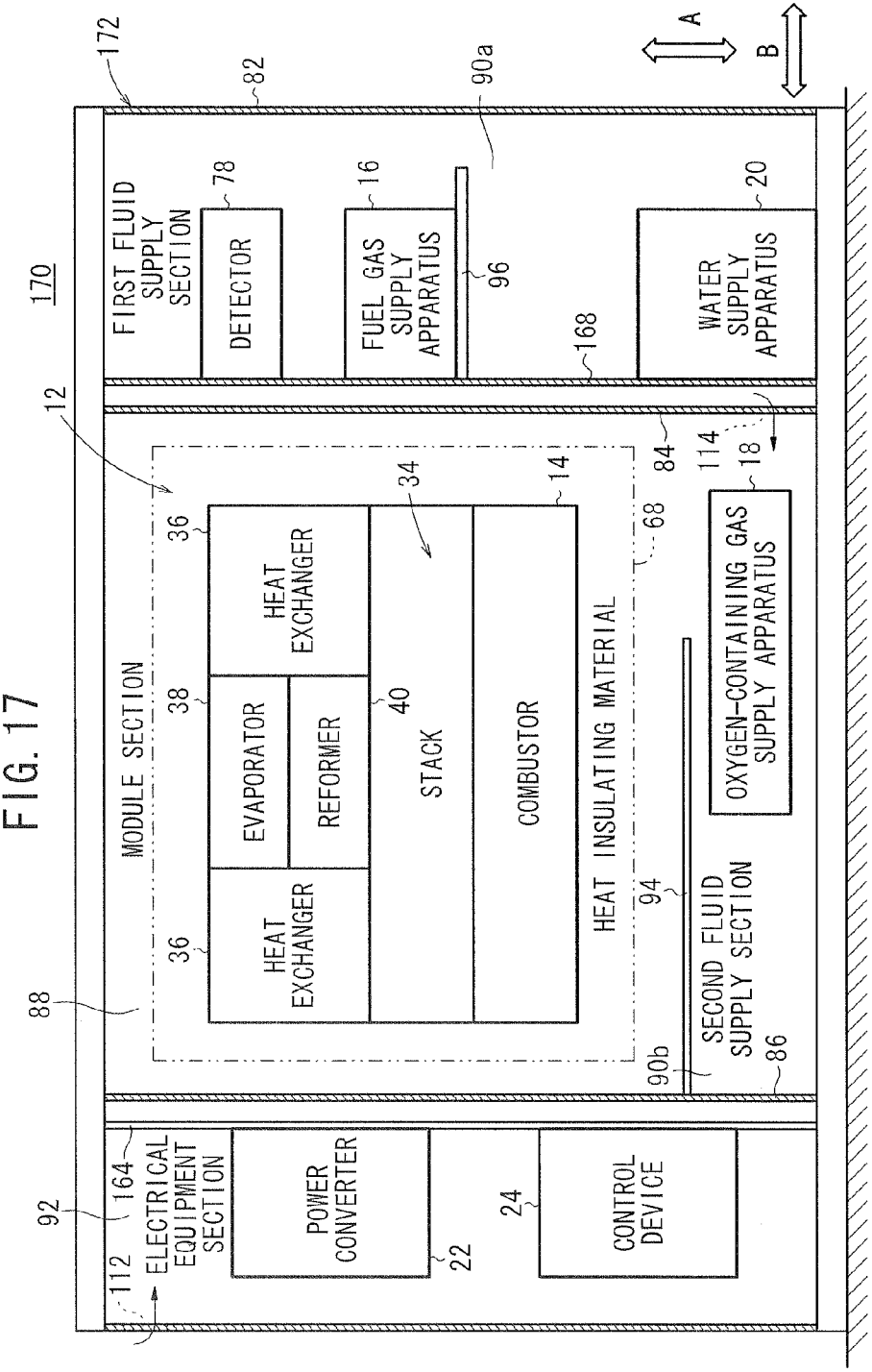
FIG. 17 is a front view showing the fuel cell system.

FIG. 15 is a perspective view schematically showing a fuel cell system 170 according to a fifth embodiment of the present invention. FIG. 16 is a plan view showing the fuel cell system 170, and FIG. 17 is a front view showing the fuel cell system 170.

As in the case of the fourth embodiment, the space in a casing 172 of the fuel cell system 170 is divided in a direction indicated by an arrow B through a first vertical partition plate 84 and a second vertical partition plate 86. The space in the casing 172 is divided into a module section 88, and a first fluid supply section 90*a* and an electrical equipment section 92 on both sides of the module section 88 in the direction indicated by the arrow B.

A second fluid supply section 90*b* is provided under the module section 88, i.e., under a lateral partition plate 94. A first air intake port 112 is provided at an upper position of the electrical equipment section 92, and a second air intake port 114 is provided at a lower position of the first vertical partition plate 84.

A first inner partition 164, a second inner partition 166, and a third inner partition 168 forming a detour channel 116 are provided in the casing 172. The detour channel 116 prevents the oxygen-containing gas from flowing straight from the first air intake port 112 into the second air intake port 114.

In the fifth embodiment, the same advantages as in the case of the first to fourth embodiments are obtained.

Figure 18:
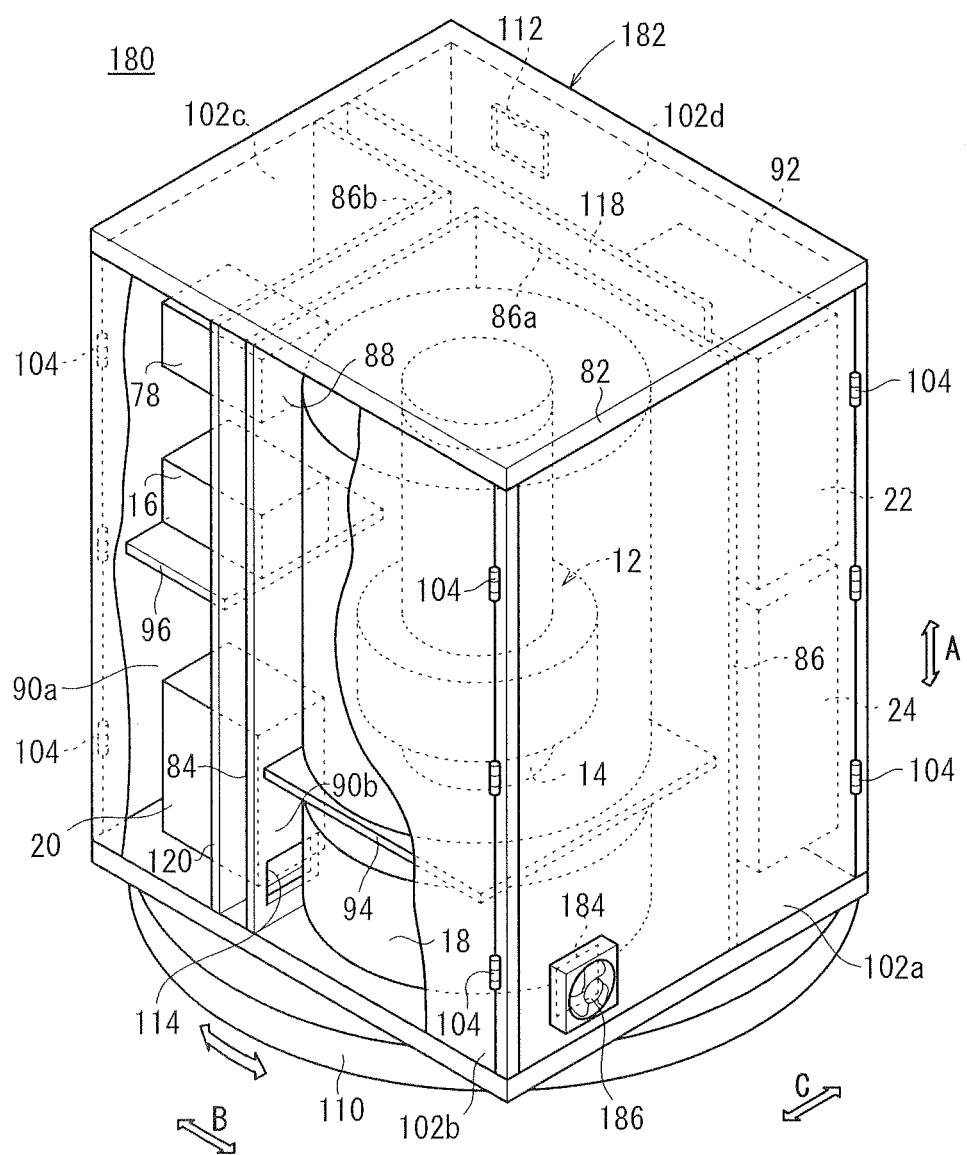
FIG. 18 is a perspective view schematically showing a fuel cell system according to a sixth embodiment of the present invention.
Figure 19:
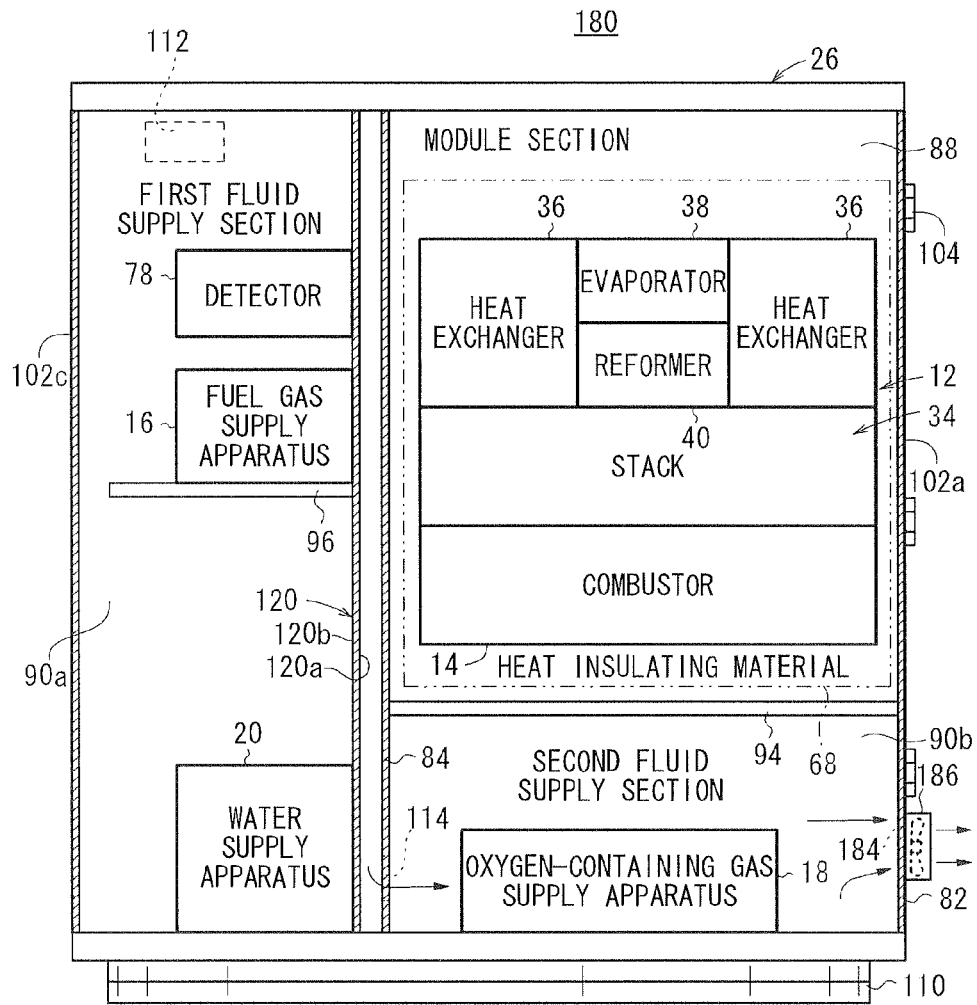
FIG. 19 is a front view showing the fuel cell system.
Figure 20:
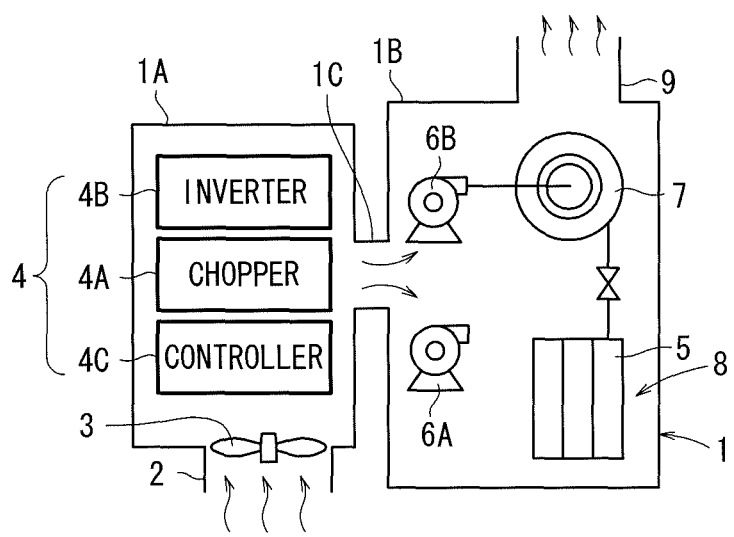
FIG. 20 is a perspective view schematically showing a fuel cell power generator apparatus disclosed in Japanese Laid-Open Patent Publication No. 04-075263.
Figure 21:
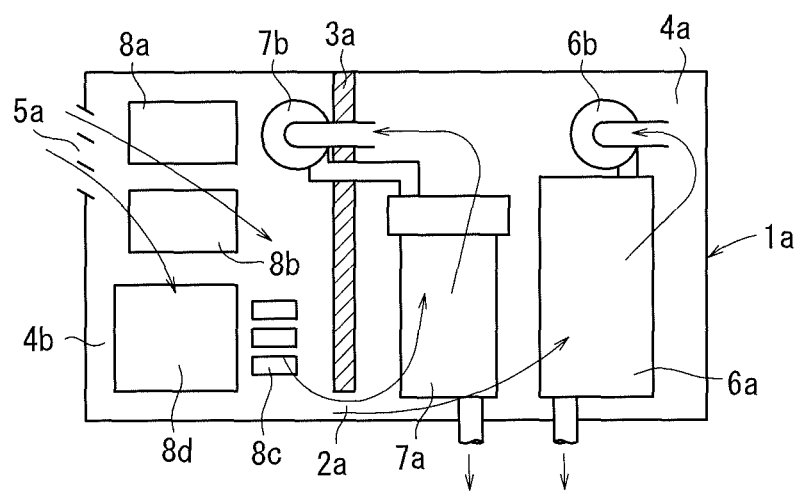
FIG. 21 is a view schematically showing a ventilation structure disclosed in Japanese Laid-Open Patent Publication No. 05-290868.

FIG. 18 is a perspective view schematically showing a fuel cell system 180 according to a sixth embodiment of the present invention. FIG. 19 is a front view showing the fuel cell system 180.

A second fluid supply section 90*b* is provided in a casing 182 of the fuel cell system 180. The second fluid supply section 90*b* has a gas discharging port 184 for discharging the oxygen-containing gas that has not been consumed in the oxygen-containing gas supply apparatus 18 (unconsumed oxygen-containing gas) to the outside of the casing 182. A gas discharging fan 186 is attached to the external side of the casing 182, at the gas discharging port 184.

In the sixth embodiment, the unconsumed oxygen-containing gas that has been sucked through the first air intake port 112 by operation of the oxygen-containing gas supply apparatus 18, does not stagnate in the second fluid supply section 90*b*. This is because the unconsumed oxygen-containing gas in the second fluid supply section 90*b* is forcibly discharged to the outside through the gas discharging port 184 by operation of the gas discharging fan 186.

Thus, the oxygen-containing gas sucked through the first air intake port 112 into the casing 182 is forcibly supplied from the second air intake port 114 to the second fluid supply section 90*b* through the detour channel 116. Accordingly, supply of the heated oxygen-containing gas to the fuel cell module 12*a* is facilitated, and improvement in the efficiency of operating the fuel cell module 12*a* is achieved.

Moreover, natural convection is suppressed to a greater extent, and forced convection is facilitated in the electrical equipment section 92 and the second fluid supply section 90*b* (low temperature sections). Thus, rise in the temperatures of the low temperature sections is suppressed suitably.

In the sixth embodiment, in effect, the fuel cell system 10 according to the first embodiment is used. However, the present invention is not limited in this respect. The features of the sixth embodiment are also applicable to the second to fifth embodiments.

The invention claimed is:

1. A fuel cell system comprising:
 a fuel cell module for generating electrical energy by electrochemical reactions of a fuel gas and an oxygen-containing gas;
 an oxygen-containing gas supply apparatus for supplying the oxygen-containing gas to the fuel cell module;
 a power converter for converting direct current electrical energy generated in the fuel cell module to electrical energy according to requirements specification;
 a control device for controlling the amount of electrical energy generated in the fuel cell module; and
 a casing containing at least the fuel cell module, the oxygen-containing gas supply apparatus, the power converter, and the control device,
 wherein the casing is divided, by a plurality of inner partition walls, into a module section where the fuel cell module is provided, a fluid supply section where the oxygen-containing gas supply apparatus is provided, and an electrical equipment section where the power converter and the control device are provided;
 the plurality of inner partition walls include a first inner partition wall and a second inner partition wall;
 the electrical equipment section has a first air intake port for sucking the oxygen-containing gas from the outside of the casing into the electrical equipment section;
 the fluid supply section has a second air intake port for sucking the oxygen-containing gas sucked through the first air intake port, into the oxygen-containing gas supply apparatus;
 the casing contains therein a detour channel for preventing the oxygen-containing gas from flowing straight from the first air intake port to the second air intake port;
 the detour channel is formed between the first inner partition wall and the second inner partition wall;
 the first inner partition wall is provided adjacent to at least the electrical equipment section or the fluid supply section;
 the space in the casing is divided into the electrical equipment section or the fluid supply section and the module section by the second inner partition wall, and the distance L1 between the second inner partition wall and one wall surface of the first inner partition wall is smaller than the distance L2 between a wall forming the electrical equipment section or the fluid supply section, the wall being positioned on a side opposite to the module section, and the other wall surface of the first inner partition wall, the distance L1 between the second inner partition wall and one surface of the first inner partition wall forms an opening of the detour channel.

2. The fuel cell system according to claim 1, wherein the power converter and the control device provided in the electrical equipment section or the oxygen-containing gas supply apparatus provided in the fluid supply section are attached to the other wall surface of the first inner partition wall.

3. The fuel cell system according to claim 1, wherein the power converter in the electrical equipment section is provided at an upper position of the casing.

4. The fuel cell system according to claim 1, wherein the first air intake port is positioned above the second air intake port.

5. The fuel cell system according to claim 1, wherein the fluid supply section has a gas discharging port for discharging unconsumed oxygen-containing gas not to be supplied to the oxygen-containing gas supply apparatus, to the outside of the casing therethrough; and a gas discharging fan for facilitating discharge of the unconsumed oxygen-containing gas.

6. The fuel cell system according to claim 1, wherein the fuel cell module is a solid oxide fuel cell module.

7. The fuel cell system according to claim 1, wherein the first inner partition wall is made of heat insulating material.

8. The fuel cell system according to claim 1, wherein the first inner partition wall is made of heat conductive material.

* * * * *